UNITED STATES PATENT OFFICE.

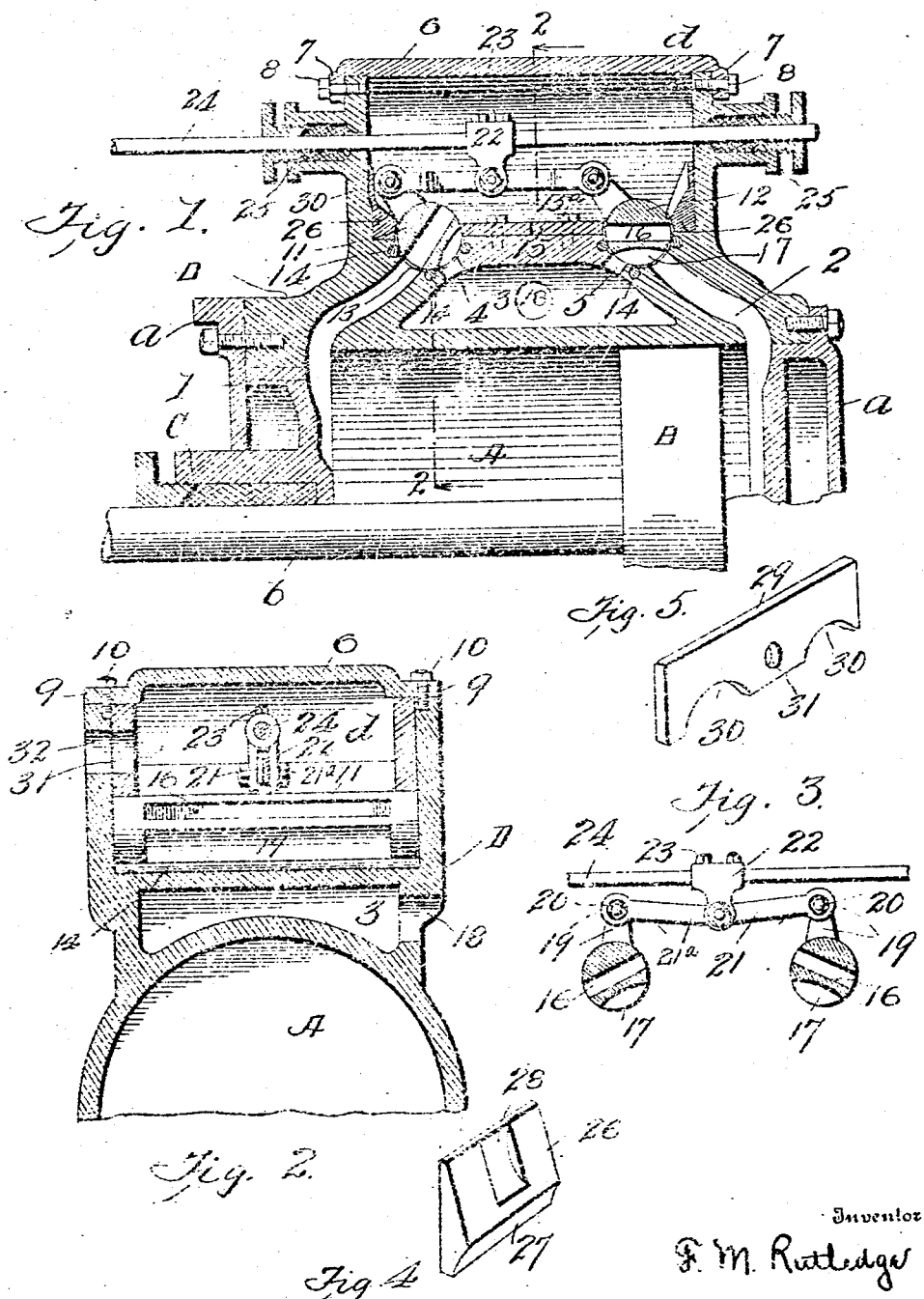

FRANCIS M. RUTLEDGE, OF NORTONVILLE, KANSAS.

STEAM-ENGINE VALVE.

No. 396,843.     Specification of Letters Patent.     Patented Aug. 25, 1908.

Application filed December 24, 1906. Serial No. 349,307.

*To all whom it may concern:*

Be it known that I, FRANCIS M. RUT-LEDGE, a citizen of the United States, residing at Nortonville, in the county of Jefferson and State of Kansas, have invented certain new and useful Improvements in Steam-Engine Valves, of which the following is a specification.

This invention relates to new and useful improvements in valves for steam engines and has particular reference to an improvement in rotary valves for controlling steam supply and exhaust from the engine cylinder with relation to the steam chest.

The invention has for its object to provide steam valves of the rotary type which can be operated through suitable gearing with a minimum degree of friction and expenditure of power.

The detailed construction will appear in the course of the following description in which reference is had to the accompanying drawings forming a part of this specification, like numerals designating like parts throughout the several views, wherein, Figure 1 is a central longitudinal section of a steam chest and cut off valves therein constructed in accordance with my invention. Fig. 2 is a central transverse section on line 2—2 of Fig. 1, looking in the direction of the arrow. Fig. 3 is a detailed section of parts in elevation, showing the valves and their associated parts, and Figs. 4 and 5 are detailed perspective views of elements to be hereinafter specifically referred to.

Referring specifically to the accompanying drawings, the letter A designates the engine cylinder, B the piston movable therein, *b* the piston rod, C the stuffing box therefor, and D the steam chest which is preferably cast integral with the engine cylinder. The steam chest D embodies the valve chamber *d* which communicates with the ends of the engine cylinder A by inclined passages 1 and 2 and with the exhaust chamber 3 by inclined passages 4 and 5. To the ends of the cylinder A are bolted the cylinder heads *a* of conventional form. The valve chamber *d* is closed by a cap plate 6 having depending end flanges 7 through which pass fastening bolts 8 to secure the plate 6 to the ends of the valve chamber *d* and having horizontal side flanges 9 through which pass bolts or other fastening means 10 to secure the plate 6 to the side portions of the chamber *d*.

The respective series of passages 1 and 4 and 2 and 5 are controlled by rotary cylindrical valves 11 and 12. These valves are counterparts in construction and a description of the valve 11 will likewise apply to the valve 12. The h... of the valve chamber *d* is formed with transverse concave depressions 13 within which the valves 11 and 12 are seated for rotatory movement. It is preferred to reduce the friction of such movement to minimum degree by providing transverse friction rollers 14 which may be packed if so desired. The valves 11 and 12 are removable for the purpose of repairs, regrinding or renewal, but are held from any play by means of transverse plates 15 interposed therebetween and held to the floor of the steam chest D by bolts $15^a$. The plates 15 have their outer edges curved to conform to the curvature of the valves 11 and 12 and serve as stops to prevent their accidental displacement from their sides and likewise to prevent any play such as would cause the escape of steam. Each valve 11 and 12 is formed with an opening 16 extending transversely therethrough and controlling the passage of steam from the valve chamber *d* through the passages 1 and 2. Each of said valves is likewise formed on its underneath face with a recess 17 extending transversely thereof and designed to control the travel of steam from either of the passages 1 and 2 through the respective ports 4 and 5 and into the exhaust chamber 3, whence the egress of the steam is permitted by way of the exhaust port 18 which has connection with the discharge pipe.

The valves 11 and 12 are designed to be moved in unison and to this end are each provided with outwardly extending arms 19 which are pivotally connected as at 20 to the adjacent ends of pivotally operating bars 21 and $21^a$, said operating bars overlapping one another at their inner ends and being movably secured centrally of the outer ends thereof by means of a pivoted clip 22 which is adjustably connected by means of set screws 23 with a valve rod 24 projected longitudinally through the valve chamber *d* and working in stuffing boxes 25. The rod 24 is reciprocated by means of any approved valve gearing which may be employed. Rearwardly of the valves 11 and 12 there are disposed the elements shown in Fig. 4, comprising end bearing plates 26 which rest upon the floor of the chamber *d* and have their exposed faces curved as at 27 to conform to the curvature of the valves. The upper portions of the plates 26 are provided with vertical recesses 28 which provide for the oscillating movement of the arms 19 adjacent thereto. It is preferred to provide at the ends of the valves 11 and 12 bearing plates such as are illustrated in detail in Fig. 5. These plates are designated by the numeral 29 and are disposed in juxtaposed relation to the side walls of the chamber $d$. The plates 29 are formed in their lower edges with concave recesses 30 which snugly surround the curved surfaces of the valve and afford a journal therefor. One of the plates 29, as is shown in Figs. 2 and 5, is formed with a central opening 31 which registers with the steam inlet opening 32 provided in the side of the chamber $d$.

In operation steam is admitted into the chamber $d$ from a source of supply through the registering openings 32 and 31. In the position of the valve shown in Fig. 1 the steam which is admitted will pass through the opening 16 of the valve 11 and through the passage 1 and to the end of the cylinder A forcing the piston B to the right. In such movement the piston B discharges the prior charge of steam through the passage 2, the recess 17 of the valve 12 and the passage 14 into the exhaust chamber 3 whence it passes through the opening 18 and is disposed of by any suitable exhaust mechanism. When the piston B reaches the limit of its travel to the right the valve gearing will act to reciprocate the rod 24 to the right. In this movement the rod 24 through the connections described will simultaneously rotate the valves 11 and 12 and will cause the steam in the chamber $d$ to pass through the opening 16 of the valve 12, the passage 2 and into the end of the cylinder A, forcing the piston B to the left. At the same time the piston B will discharge the prior charge of steam in the left end of the cylinder through the passage 1, the recess 17 of the valve 11 and the passage 4 into the exhaust chamber 3, whence it passes through the port 18. When the piston B reaches the limit of its travel to the left, the valve gearing will reciprocate the rod 24 to the left and will throw the valves back to the position in Fig. 1. The operations above described are repeated in successive order during the operation of the engine, as will be readily understood.

While the elements herein shown and described are well adapted to serve the functions set forth, it is obvious that various minor changes may be made in the proportions, shape and arrangement of the several parts without departing from the spirit and scope of my invention as defined in the appended claim.

The combination with a steam engine cylinder and a steam chest imposed thereon and having passages communicating therebetween at both ends thereof, of an exhaust chamber located between said steam chest and said cylinder and having openings through the walls thereof, communicating with said passages, cylindrical valves rotatably associated within said passages having slotted openings adapted to alternately register said passages with said steam chest and said exhaust chamber openings, connecting arms extending upwardly from said valves, anti-friction rollers mounted to bear against the peripheral surface of said valves, operating bars pivotally connected at their outer ends to the ends of said valve arms, a clip member pivotally connecting the inner ends of said operating bars, a valve rod arranged through said steam chest, said clip member having a tubular portion slidably mounted on said valve rod, and set screws arranged through said tubular portion and engaging said valve rod to normally hold said clip member stationary with relation thereto, substantially as described.

In testimony whereof I affix my signature in presence of two witnesses.

FRANCIS M. RUTLEDGE.

Witnesses:
 GEO. F. RANDOLPH,
 J. H. WIGELSWORTH.